(12) United States Patent
Costaz et al.

(10) Patent No.: US 8,696,070 B2
(45) Date of Patent: Apr. 15, 2014

(54) ENHANCED BRAKING VALVE

(75) Inventors: Dominique Costaz, Verberie (FR); Fabien Roger, Verberie (FR)

(73) Assignee: Poclain Hydraulics Industrie, Verberie (FR)

( * ) Notice: Subject to any disclaimer, the term of this patent is extended or adjusted under 35 U.S.C. 154(b) by 144 days.

(21) Appl. No.: 13/327,600

(22) Filed: Dec. 15, 2011

(65) Prior Publication Data

US 2012/0205203 A1 Aug. 16, 2012

(30) Foreign Application Priority Data

Dec. 20, 2010 (FR) ...................................... 10 60850

(51) Int. Cl.
*B60T 13/74* (2006.01)
(52) U.S. Cl.
USPC ................................ 303/3; 303/9.61; 303/11
(58) Field of Classification Search
USPC .................. 303/2, 3, 9.61, 10, 11, 13, 57, 59, 303/113.1, 113.5, 119.1, 154, 155
See application file for complete search history.

(56) References Cited

U.S. PATENT DOCUMENTS 6,206,484 B1 *   3/2001  Ganzel ....................... 303/113.4
2013/0127239 A1 * 5/2013  Brenninger et al. ......... 303/9.61

FOREIGN PATENT DOCUMENTS

DE  10 2005 019 479 B3   1/2007
FR  2 897 580              8/2007
JP  09071262 A  *         3/1997

* cited by examiner

*Primary Examiner* — Thomas J Williams
(74) *Attorney, Agent, or Firm* — Blakely Sokoloff Taylor & Zafman (57) ABSTRACT

A hydraulic braking valve having an inlet orifice intended to be connected to a pressure supply, an outlet orifice intended to be connected to a braking unit, a leak orifice intended to be connected to a tank, a power distributor adapted so as to connect the inlet orifice to the outlet orifice in a braking configuration, and a leak orifice to the outlet orifice in a rest configuration. The power distributor is driven by two independently driven calibrators.

10 Claims, 5 Drawing Sheets

FIG. 1 STATE OF THE ART

ENHANCED BRAKING VALVE

GENERAL TECHNICAL FIELD

The present invention relates to hydraulic valves for braking systems, notably for trailer braking systems having a holding parking break.

STATE OF THE ART

Many vehicles or machines are provided with braking systems having a holding parking break, this parking break being neutralized by the application of pressure when these vehicles or machines are used.

Figure 1:
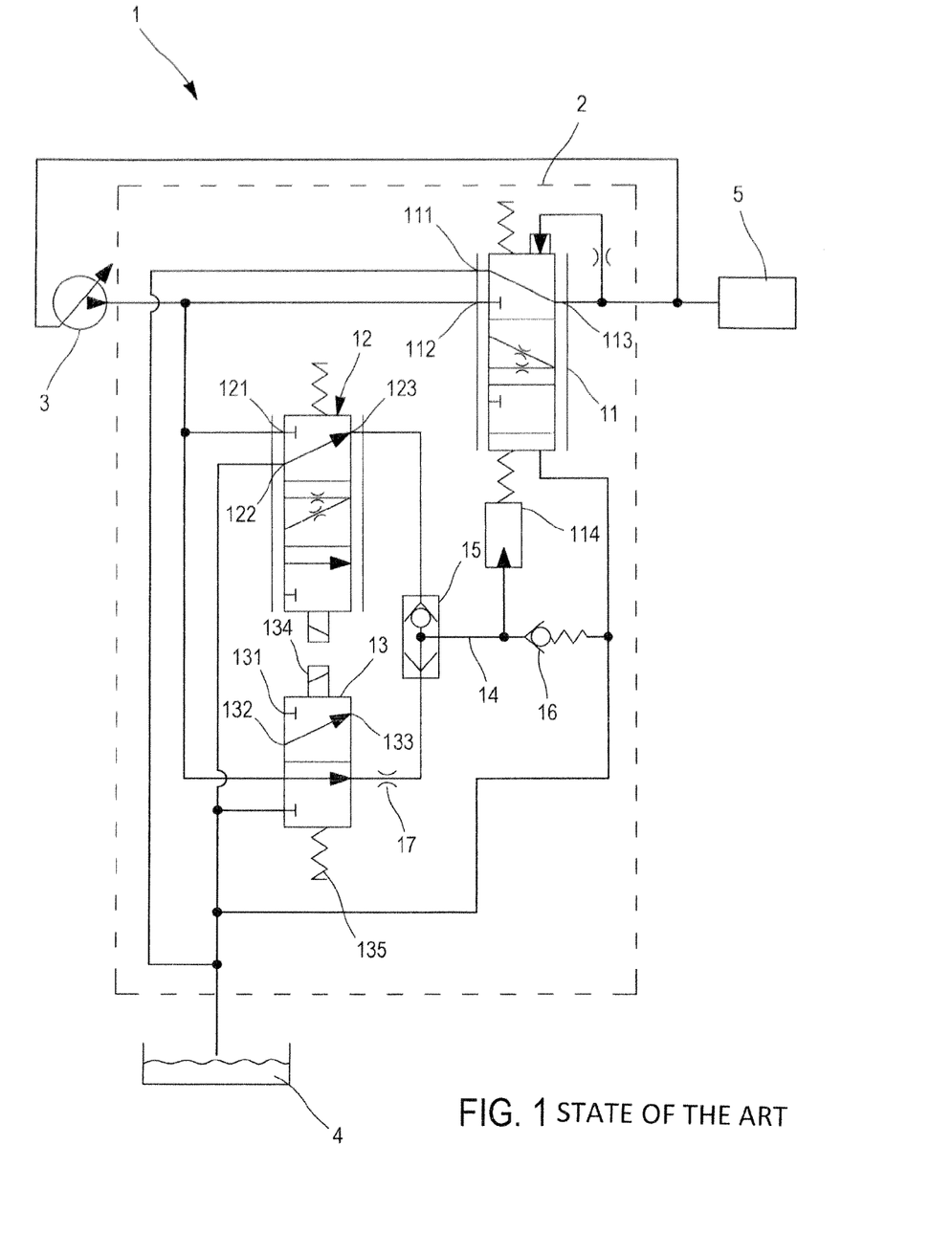
FIG. 1, described earlier, shows a hydraulic circuit comprising a braking valve according to the state of the art.

FIG. 1 illustrates a braking circuit 1 comprising a braking valve 2 according to the state of the art.

The braking valve 2 is connected through an inlet orifice to a load-controlled hydraulic pump 3, through a leak orifice to a tank 4 at ambient pressure, and through an outlet orifice to braking means 5.

Load-dependent control of the hydraulic pump 3 is achieved via a load line which samples pressure at the outlet orifice of the braking valve 2 and thereby drives a displacement plate of the hydraulic pump 3.

The braking valve 2 as illustrated comprises:
a proportional power distributor 11, comprising:
  a first orifice 111 connected to the leak orifice of the braking valve 2,
  a second orifice 112 connected to the inlet orifice of the braking valve 2,
  a third orifice 113 connected to the outlet orifice of the braking valve 2;
said power distributor 11 being driven via control means,
a proportional reducer 12 having:
  a first orifice 121, connected to the inlet orifice of the braking valve 2,
  a second orifice 122, connected to the leak orifice of the braking valve 2,
  a third orifice 123, connected to a calibration line 14 via a first inlet of a shuttle valve 15;
a switch 13 having:
  a first orifice 131, connected to the inlet orifice of the braking valve 2,
  a second orifice 132, connected to the leak orifice of the braking valve 2,
  a third orifice 133, connected to a calibration line 14 via a second inlet of the shuttle valve 15.

The shuttle valve 15 only allows the highest pressure among the pressures at the third orifices 123 and 133 to feed said calibration line 14, the third orifice 133 of the switch 13 being connected to the shuttle valve 15 via a flow limiter 17.

The calibration line 14 is further connected to a means 114 for calibrating the power distributor 11 on the one hand and both to the leak orifice of the braking valve 2 and to a draining means of the power distributor 11 via a non-return valve with a spring 16, on the other hand. Thus, if the pressure in the calibration line 14 is too high, the non-return valve with the spring 16 opens, and allows discharge of the pressure towards the leak orifice of the braking valve, and therefore typically towards the tank 4.

The calibration means 114 consists of a hydraulic calibration means which calibrates a thrust spring; when this calibration means 114 is released, the calibration setting is zero.

The power distributor 11 has three configurations:
a rest configuration, wherein its third orifice 113 is connected to its first orifice 111 and its second orifice 112 is closed, which in the circuit illustrated in FIG. 1, connects the braking means 5 to the tank 4;
a calibration configuration, wherein the first orifice 111 and the second orifices 112 are both connected to the third orifice 113 via flow limiters,
a braking configuration, wherein its first orifice 111 is closed, while its second orifice 112 is connected to its third orifice 113.

The proportional reducer 12 has three configurations:
a braking configuration wherein the first orifice 121 is connected to the third orifice 123 while the second orifice 122 is closed,
a calibration configuration wherein the first orifice 121 and the second orifice 122 are both connected to the third orifice 123 via flow limiters,
a rest configuration, wherein the first orifice 121 is closed, while the second orifice 122 is connected to the third orifice 123.

The switch 13 has two configurations:
a braking configuration wherein the first orifice 131 is connected to the third orifice 133 while the second orifice 132 is closed,
an operating configuration, wherein the first orifice 131 is closed, while the second orifice 132 is connected to the third orifice 133.

The switch 13 is an «on/off» switch, which acts as a safety element of the circuit. By default, this switch 13 is in the braking position and switches to the operating configuration when it is driven via an electric driving means 134. In the case of an electrical failure of the system, the switch then switches to the braking configuration under the effect of an elastic means 135, which may thus lead the flow from the pump 3 directly to the calibration means 114, which will lead to supplying pressure to the braking means 5.

By default, the power distributor 11 and proportional reducer 12 are in a rest configuration.

During operation, the proportional reducer 12 is switched to its calibration configuration. The proportional reducer 12 is driven so as to transmit a given pressure to the calibration means 114, which will thus drive the power distributor 11 and switch it towards its calibration configuration.

The pump 3 supplies pressure to the braking valve 2 via its inlet orifice, which will thus transmit to the braking means 5 a pressure determined by the calibration carried out by the calibration means 114.

In present circuits, a ratio of the order of 9 is applied between the pressure transmitted by the proportional reducer 12 and the pressure delivered to the brake 5 by the power distributor 11.

This braking circuit according to the state of the art has several drawbacks for which the invention suggests a remedy.

Actually, the large ratio between the braking pressure and the control pressure exerted on the power distributor 11 via the proportional reducer 12 implies that the deviations of the control pressure are multiplied by the same ratio and will therefore have a strong impact on the braking pressure.

Further the supply of power is achieved with a load-controlled pump which therefore delivers a highly variable pressure.

Further, in the case of specific national standards such as the Italian standard, the brake pressure has to be regulated at substantially 12.5 bars, which this circuit is unable to achieve suitably. It is therefore necessary to specifically adapt the braking valve depending on its destination, which is particularly restrictive on a production level.

PRESENTATION OF THE INVENTION

The present invention aims at presenting a braking valve and a hydraulic braking circuit which does not have these drawbacks.

According to a first aspect, the present invention relates to a hydraulic braking valve comprising:
- an inlet orifice intended to be connected to a pressure supply means,
- an outlet orifice intended to be connected to a braking means,
- a leak orifice intended to be connected to a tank,
- a power distributor adapted so as to connect the inlet orifice to the outlet orifice in a braking configuration, and the leak orifice to the outlet orifice in a rest configuration, said braking valve being characterized in that the power distributor is driven by two calibration means driven independently.

This braking valve may have one or more of the following features, taken independently or as a combination:
- the calibration means comprise:
    i. a first calibration means achieving fine calibration for a pressure at the outlet orifice comprised between 10 and 15 bars,
    ii. a second calibration means achieving calibration for a pressure at the outlet orifice comprised between 0 and 140 bars;
- only the one of said calibration means delivering the highest calibration pressure drives the power distributor;
- the power distributor is driven by a supplied calibration pressure corresponding to the sum of the calibration pressure delivered by the first and the second calibration means;
- the first and second calibration means are proportional reducers mounted in parallel;
- the first calibration means is a proportional reducer, and in that said second calibration means is a pressure limiter;
- the first calibration means is a spring compressed by a hydraulic piston, and in that said second calibration means is a pressure limiter;
- calibration is achieved with a 1:1 ratio between the calibration pressure of the power distributor (26) and the outlet orifice pressure; or
- the first calibration means and the second calibration means achieve calibration of the power distributor with a ratio equal to 1 and with a ratio different from 1 respectively.

According to a second aspect, the invention also relates to a hydraulic braking circuit comprising:
- a braking valve as defined earlier,
- a hydraulic pump delivering a variable pressure connected to the inlet orifice of said valve,
- a tank at ambient pressure connected to the leak orifice of said valve,
- hydraulic braking means connected to the outlet orifice of said valve.

According to a third aspect, the invention also relates to a vehicle equipped with a braking circuit as defined earlier.

PRESENTATION OF THE FIGURES

Other features, objects and advantages of the invention will become apparent from the following description, which is purely illustrative and non-limiting, and which should be read with reference to the appended drawings, wherein.

On the whole of the figures, identical or similar elements are indicated with the same numerical references.

DETAILED DESCRIPTION

Figure 2:
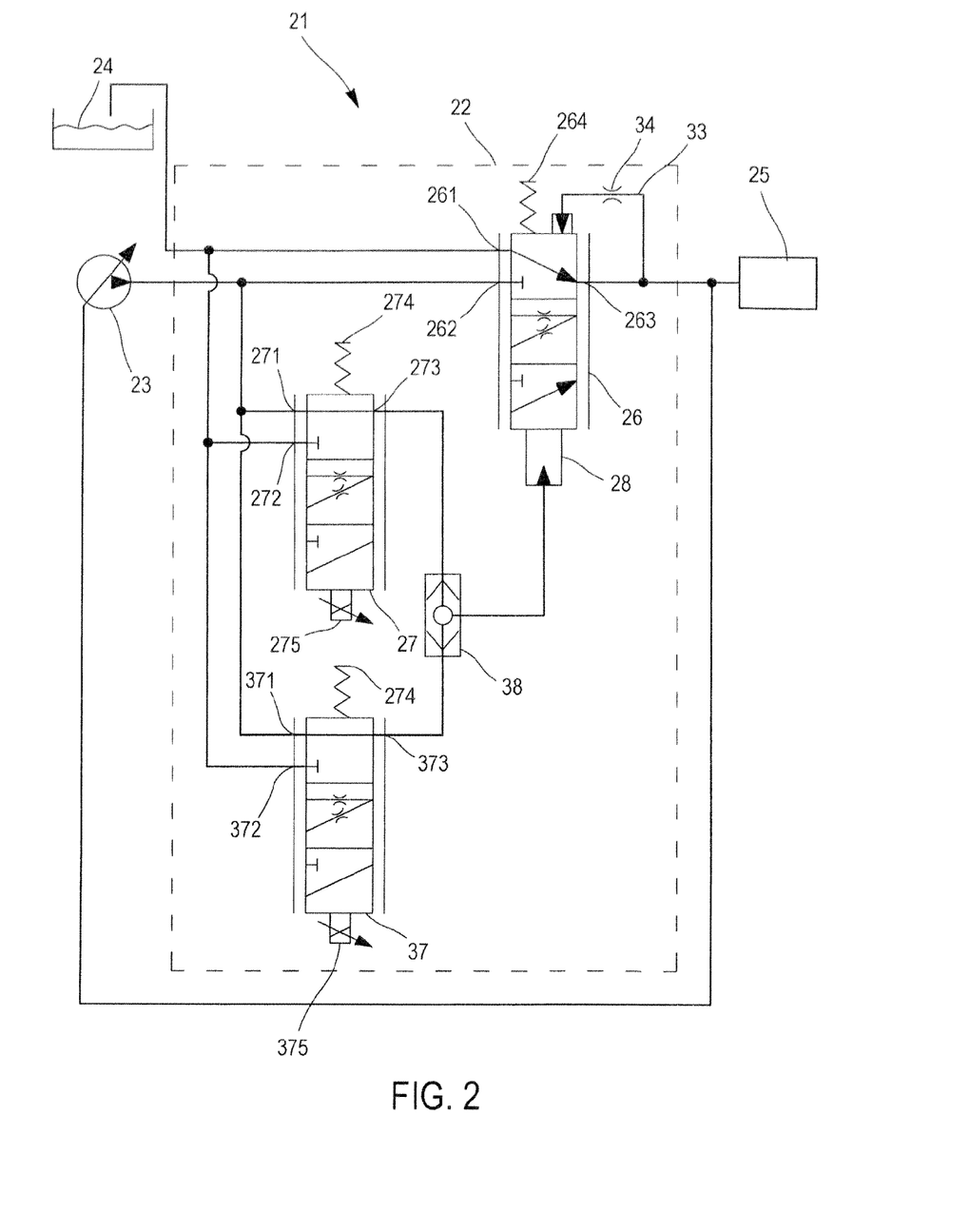
FIG. 2 shows an embodiment of a hydraulic braking circuit comprising a valve according to the invention.

FIG. 2 shows a hydraulic braking circuit 21 comprising a braking valve 22 according to the invention.

The braking valve 22 as illustrated comprises:
- an inlet orifice connected to a pressure supply means 23, typically a load-controlled hydraulic pump,
- a leak orifice connected to a tank 24, typically at ambient pressure,
- an outlet orifice connected to braking means 25.

In the same way as in the circuit illustrated in FIG. 1, load-dependent control of the hydraulic pump 23 is achieved via a load line sampling the pressure at the outlet orifice of the braking valve 22 and thus driving a displacement plate of the hydraulic pump 23.

The braking valve 22 further comprises:
- a proportional power distributor 26 having three orifices:
    - a first orifice 261 connected to the leak orifice of the braking valve 22;
    - a second orifice 262 connected to the inlet orifice of the braking valve 22;
    - a third orifice 263 connected to the outlet orifice of the braking valve 22;
- this power distributor 26 being driven by calibration means 28 acting on its drawer so as to alternate between:
    - a rest configuration wherein the first orifice 261 is connected to the third orifice 263 while the second orifice 262 is closed;
    - a calibration configuration wherein the first orifice 261 and the second orifice 262 are both connected to the third orifice 263 via flow limiters,
    - a braking configuration wherein the first orifice 261 is closed while the second orifice 262 is connected to the third orifice 263;
- a first calibration means consisting of a first proportional distributor 27 having three orifices:
    - a first orifice 271 connected to the inlet orifice of the braking valve 22;
    - a second orifice 272 connected to the leak orifice of the braking valve 22;
    - a third orifice 273 connected to a first inlet of a shuttle valve 38,
- this driving distributor 27 being able to alternate between:
    - a rest configuration wherein the first orifice 271 is closed while the second orifice 272 is connected to the third orifice 273;
    - a calibration configuration wherein the first orifice 271 and the second orifice 272 are both connected to the third orifice 273 via flow limiters,
    - a braking configuration wherein the first orifice 271 is connected to the third orifice 273 while the second orifice 272 is closed,
- a second calibration means consisting of a second proportional distributor 37 having three orifices:
    - a first orifice 371 connected to the inlet orifice of the braking valve 22;

a second orifice 372 connected to the leak orifice of the braking valve 22;

a third orifice 373 connected to a second inlet of the shuttle valve 38, this second proportional distributor 37 being able to alternate between:

a rest configuration wherein the first orifice 231 is closed while the second orifice 232 is connected to the third orifice 233;

a calibration configuration wherein the first orifice 371 and the second orifice 372 are both connected to the third orifice 373 via flow limiters, a braking configuration wherein the first orifice 371 is connected to the third orifice 373 while the second orifice 372 is closed.

The shuttle valve 38 therefore has two inlets respectively connected to the third orifices 273 and 373 of the calibration means, and an outlet which transfers the highest pressure among both inlet pressures towards calibration means 28, typically a piston.

Each of the calibration means 27 and 37 is provided with driving means in order to control the pressure which they deliver. In the embodiment illustrated in FIG. 2, each of the calibration means 27 and 37 is provided with a variable electric control 275 and 375 and a thrust spring 274 and 374 being opposed to the electric controls 275 and 375.

In the absence of any control applied to the calibration means 27 and 37, the latter are in a braking configuration at their maximum calibration pressure. The calibration means 27 and 37 calibrate the power distributor 26 by means of the calibration means 28 to the maximum calibration pressure which is the highest of the two, which therefore leads to delivery of a maximum allowed braking pressure to the braking means 25, typically equal to 140 bars.

The calibration configurations of the proportional distributors achieve bridges of flow limiters, with which a very stable pressure may be obtained, while being extremely fast in order to respond to the braking requests applied via the controls 275 and 375.

The power distributor 26 is driven via the calibration means 28, to which are opposed a thrust spring 264 and a pressure-transposition line 33 which will sample the pressure at the third orifice 263 of the power distributor 26, this pressure-transposition line being typically provided with a flow limiter 34.

The return spring 264 exerts a negligible force as compared with the forces resulting from the calibration means 28 and the pressure-transposition line 33, and exclusively ensures return to the rest position of the power distributor 26 when no pressure is applied by the calibration means 28.

The power distributor 26 is thus at equilibrium when the pressure at its third orifice 263 is equal to the pressure applied by the pressure supply means 28, which corresponds to a set pressure value. Therefore there is a 1:1 ratio between the calibration pressure of the power distributor 26 and the pressure which it delivers at the outlet orifice of the braking valve 22, which gives the possibility of not amplifying the possible inaccuracies of the pressure supply.

Both calibration means 27 and 37 are typically adapted for delivering distinct ranges of pressure, one delivering low pressures, and the other one delivering high pressures. For example, the first calibration means 27 is typically adapted for achieving fine calibration and delivering an output pressure comprised between 0 and 20 bars, while the second calibration means 37 is typically adapted for achieving calibration so as to deliver an output pressure ranging from 0 to 140 bars.

The proportional distributor 27 is typically adapted so as to deliver a pressure comprised between 0 and 20 bars, and more particularly a pressure comprised between 10 and 15 bars, for example 12.5 bars. This proportional distributor 23 may thus typically be utilized in its optimal range, for example in the case when its pressure range is from 0 to 20 bars and where it establishes a pressure of 12.5 bars, this value being substantially in the centre of its control range. Fine calibration with high accuracy may thereby be obtained, to which will be added or superposed more significant calibration achieved by the second proportional distributor 37.

During operation, the hydraulic pump 23 will supply pressure to the braking valve 22 via its inlet orifice.

The control means 275 and 375 are driven independently and will drive the calibration means 27 and 37 so that each of them achieves a given calibration allowing delivery of a braking pressure.

This independent driving of both calibration means 27 and 37 gives the possibility of achieving two distinct operating modes.

In a first operating mode, the first calibration means 27 receives a command as soon as the parking brake is released, typically so as to deliver a constant pressure comprised between 10 and 15 bars, while the second calibration means will receive a command depending on the required braking pressure, which will be described as a <<second calibration pressure>>. Independent control of both calibration means is therefore achieved.

When the second calibration pressure is less than the constant pressure delivered via the first calibration means, it is this constant pressure which is applied to the power distributor 26 via the shuttle valve 38.

Once the second calibration pressure is greater than the constant pressure delivered by the first calibration means, the shuttle valve 38 only conducts this second calibration pressure for driving the power distributor 26.

In a second operating mode, both calibration means are controlled simultaneously; the first calibration means is no longer systematically actuated as soon as the parking break is released, and therefore there is no systematic application of a minimum constant calibration value to the power distributor 26.

Both of these operating modes notably give the possibility of meeting various operating standards with a single circuit, without requiring structural modifications.

As an example, the first operating mode may be used in order to meet the requirements of the Italian standard, which imposes the application of a constant pressure of the order of 12.5 bars for releasing the parking brake of a vehicle.

The second operating mode may be used for other countries which do not have such a standard and not requiring the application of constant pressure.

Figure 3:
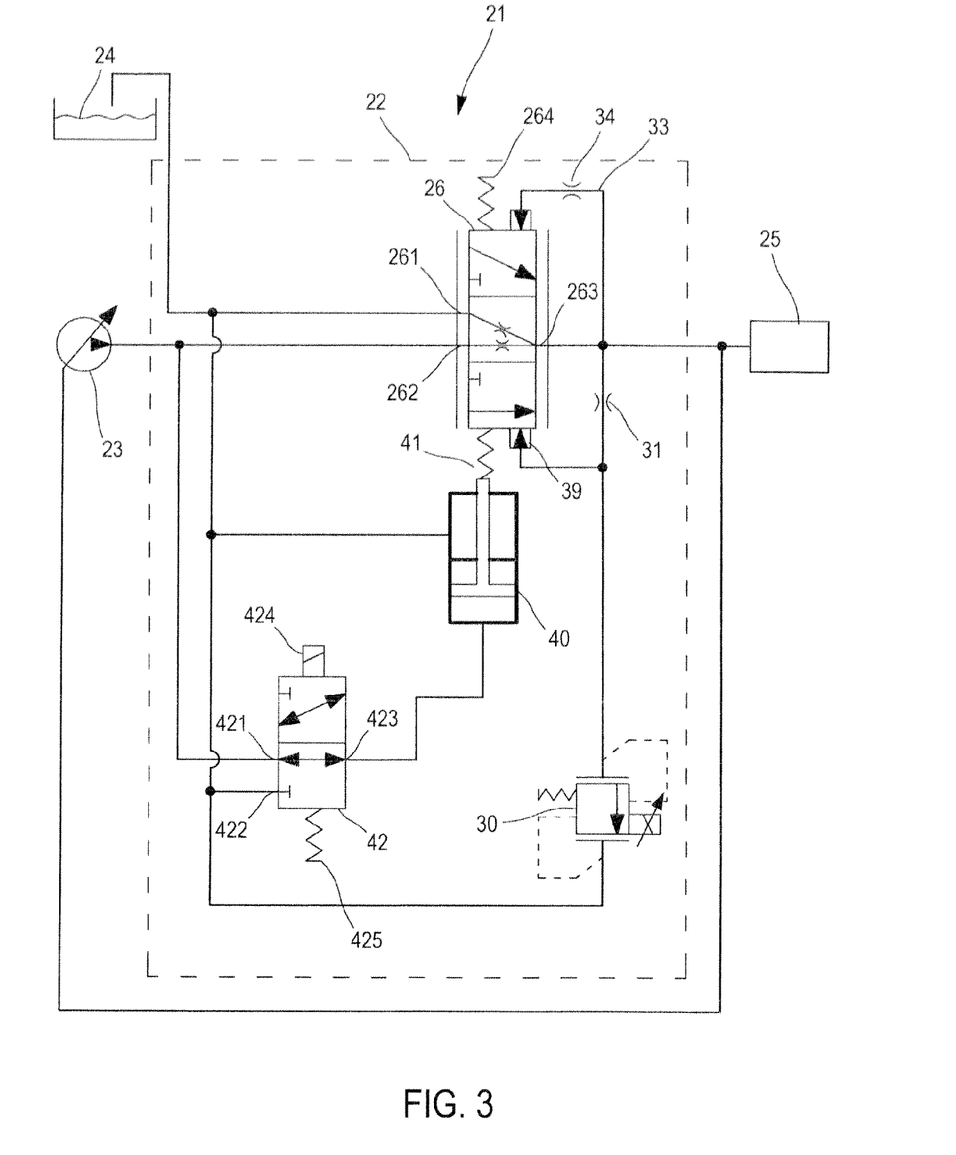
FIG. 3 shows an alternative hydraulic circuit comprising a valve according to the invention.

FIG. 3 shows an alternative of the hydraulic circuit and of the valve shown earlier in FIG. 2.

This alternative comprises a power distributor 26 as described earlier, provided with a return spring 264 and a pressure-transposition line 33.

Here, there are two means 39 and 40 for calibrating the drawer of the power distributor 26, the effects of which on the power distributor 26 add up.

In the illustrated embodiment, the calibration means 40 are an actuator having two chambers, one being connected to the leak orifice, and the other one being connected to an orifice 423 of an on/off switch 42.

This actuator 40 is associated with a spring 41 mounted in series between the actuator 40 and the power distributor 26.

This on/off switch 42 comprises:

a first orifice 421 connected to the inlet orifice of the braking valve
a second orifice 422 connected to the leak orifice of the braking valve 22;
a third orifice 423 connected to the calibration mans 40.
It may alternate between two configurations:
an ON configuration wherein the first orifice 421 is closed while the second orifice 422 is connected to the third orifice 423;
an OFF configuration wherein the first orifice 421 is connected to the third orifice 423 while the second orifice 422 is closed.

The on/off switch 42 is driven by an electric control 424 to which is opposed a thrust spring 425. By default, the thrust spring 424 maintains the on/off switch 42 in the OFF configuration. When it is powered, the electric control 424 causes the on/off switch 42 to switch to the ON configuration.

In its OFF configuration, the switch 42 directly conducts the pressure delivered by the pump 23 to the actuator 40, which leads the power distributor 26 to the braking configuration. Only the spring 41 then exerts calibration on the power distributor 26, this calibration then being typically comprised between 10 and 15 bars, for example equal to 12.5 bars, thereby allowing the national standards to be met, requiring the application of such a constant calibration pressure.

In its ON configuration, both chambers of the actuator 40 are connected to the leak orifice of the braking valve 22. The spring 41 is no longer calibrated, and the pressure at the outlet orifice is equal to ambient pressure.

In this alternative, the role of the first calibration means is therefore played by the spring 41, while the second calibration means is a pressure limiter 30. The spring 41 is compressed by the actuator 40, and exerts calibration on the power distributor 26.

The pressure limiter 30 is connected on one side to the outlet orifice of the braking valve 22 and on the other side to its leak orifice; it thus allows definition of a maximum pressure at the second calibration means 39, the excess pressure being discharged via the leak orifice.

The connection between the outlet orifice of the braking valve 22 and the pressure limiter 30 is provided with a flow limiter 31 and with a connection to the second calibration means 39, positioned between the flow limiter 31 and the pressure limiter 30.

The second calibration means 39 may assume several forms, typically a hydraulic piston.

The flow limiter 31 generates a pressure loss in the line leading from the outlet orifice to the pressure limiter 30 and to the second calibration means 39, typically comprised between 10 and 15 bars, for example equal to 12.5 bars.

The control means 30 typically has an adjustable pressure between 0 and 140 bars.

During operation, the pump 23 will supply pressure to the actuator 40 via the switch 42 which is in the OFF position, which achieves calibration of the power distributor and therefore allows delivery of pressure at the outlet orifice of the breaking valve 22.

A flow is then established through the flow limiter 31, while the pressure regulator 30 is open, without any control being applied thereto. The flow limiter 31 is typically selected so that the flow which is established therein is sufficient for obtaining fast response from the pressure regulator 30 without saturating it, and so as not to generate a too large pressure loss at the outlet of the braking valve 22.

The pressure at the outlet orifice of the braking valve 22 is then established at the calibration load pressure achieved by the spring 41, typically at 12.5 bars.

The circuit is then ready to operate as a follower circuit, by reacting to the control pressure applied to the pressure regulator 30.

The pressure limiter 30 is driven so as to define the desired braking pressure.

This calibration pressure exerted by the second calibration means 39, which is equal to the pressure defined by the control means 30, is equal to the pressure at the outlet orifice of the braking valve 22, from which are subtracted the pressure losses resulting from the flow limiter 31.

In a particular embodiment, the flow limiter 31 is calibrated so that the pressure losses which it generates, correspond to the calibration force produced by the spring 41 on the power distributor 26, typically 12.5 bars.

The braking pressure is then applied as a calibration pressure on the power distributor 26 via the second calibration means 39.

The calibration pressure applied to the power distributor is thus equal to the sum of the calibration loads applied by the first and second calibration means 41 and 39.

In the same way as for the circuit shown in FIG. 2, a return spring 264 and a pressure-transposition line 33 which will sample the pressure at the third orifice 263 of the power distributor 26, this pressure-transposition line being typically provided with a flow reducer 34, are opposed to the calibration achieved with the calibration means 39 and 41.

The return spring 264 exerts a negligible force relatively to the forces resulting from the calibration means 39 and 41 and from the pressure-transposition line 33, and only ensures the return to the rest position of the power distributor 26 when no pressure is applied by the calibration means 39 and 41.

Thus, the power distributor 26 is in an equilibrium position when the pressure at the outlet orifice and which is transmitted via the pressure-transposition line is equal to the sum of the calibration pressures applied by the calibration means 39 and 41.

Figure 4:
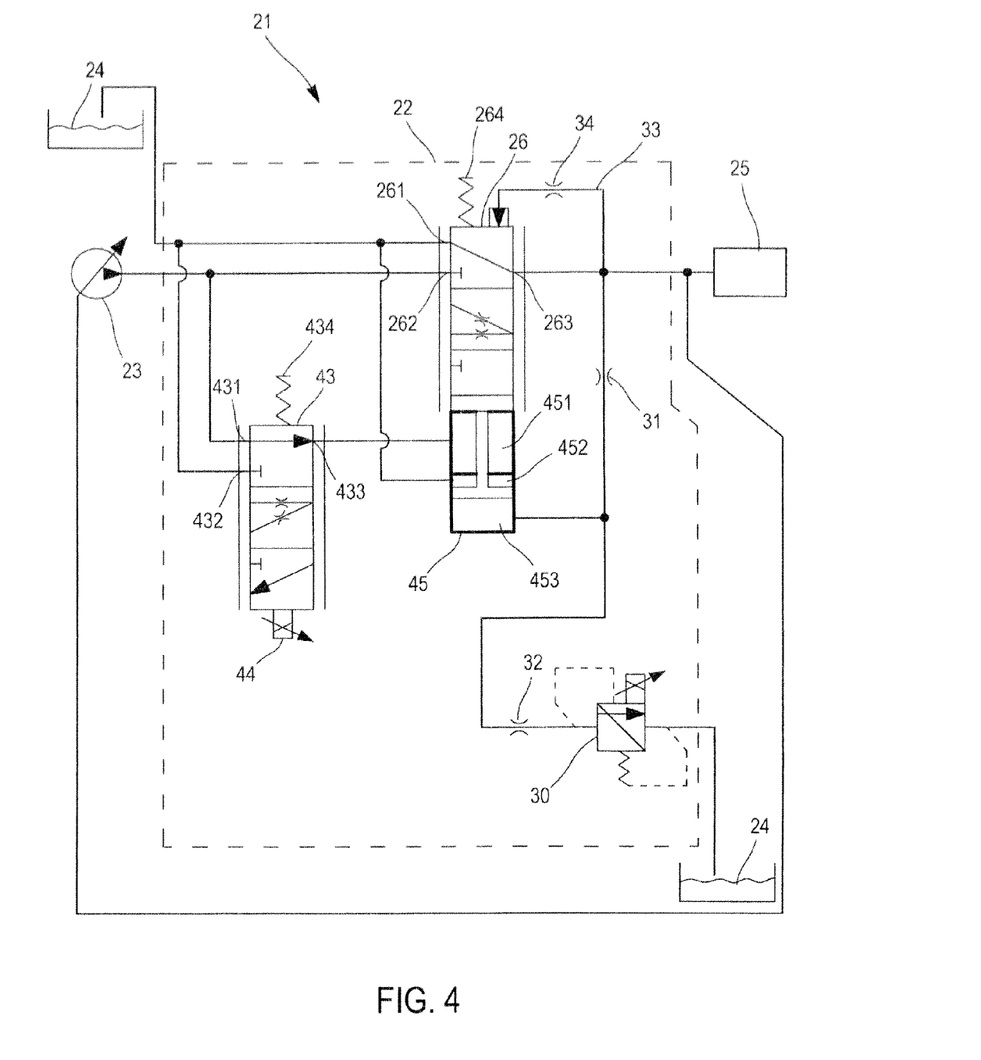
FIG. 4 shows another alternative hydraulic circuit comprising a valve according to the invention.

FIG. 4 shows another alternative of the hydraulic circuit and of the valve shown in the previous figures.

In this alternative, the calibration means acting on the power distributor 26 comprise a hydraulic actuator 45, have three chambers 451, 452 and 453 respectively and a piston between the second and third chambers.

The circuit comprises a first calibration means 43 and a second calibration means 30.

The first calibration means 43 is a proportional distributor having three orifices 431, 432 and 433.

The first orifice 431 is connected to the inlet orifice of the braking valve 22, the second orifice 432 is connected to its leak orifice, and the third orifice 433 is connected to the first chamber 451 of the actuator 45.

The proportional distributor 43 is driven by a variable electric control 44 to which is opposed a return spring 434, and has three configurations:
a rest configuration in which the second orifice 432 is closed while the first orifice 431 is connected to the third orifice 433;
a calibration configuration wherein the first orifice 431 and the second orifice 432 are both connected to the third orifice 433 via flow limiters so as to control the pressure transmitted to the braking means 25,
a brake release configuration in which the second orifice 432 is connected to the third orifice 433 while the first orifice 431 is closed, the pressure in the chamber 451 then being equal to the ambient pressure of the tank 24.

The proportional distributor 43 thus supplies pressure to the first chamber 451 of the calibration mans 45 in proportion to the electric command which is applied to it via the control 44.

This proportional distributor 43 is typically adapted so as to deliver a pressure comprised between 0 and 20 bars, and more particularly a pressure comprised between 10 and 15 bars, for example 12.5 bars. This proportional distributor 43 may thus be typically utilized in its optimum range, for example in the case when its pressure range is from 0 to 20 bars and where a pressure of 12.5 bars is established, this value being substantially in the centre of its control range. Fine calibration with high accuracy may thereby be obtained, to which will be added or superposed a more significant calibration achieved by the calibration means 30.

The second chamber 452 of the actuator 45 is connected to the leak orifice of the braking valve 22, and is thereby typically connected to the tank without any pressure 24.

The second hydraulic calibration means 30 is a pressure limiter 30 similar to the one shown in FIG. 3.

In the same way as in FIG. 3, the line connecting the pressure limiter 30 and the outlet orifice of the braking valve 22 is provided with a flow limiter 31, and a calibration line samples the pressure between this flow limiter 31 and the pressure limiter 30 in order to transfer it towards the third chamber 453 of the actuator 45.

The first flow limiter 31 is typically calibrated so as to produce a pressure loss at its terminals substantially equal to 12.5 bars.

In the illustrated embodiment, an optional flow limiter 32 is found between the calibration line and the pressure 30 and plays the role of a damper.

The operation of this alternative is similar to the operation of the alternative shown in FIG. 3.

The proportional distributor 43 and the pressure regulator 30 will each apply pressure in the first 451 and third chamber 453 of the actuator 45, respectively, which will thereby achieve calibration of the power distributor 26 corresponding to the sum of the calibration pressures achieved by the proportional distributor 43 and the pressure limiter 30.

In the same way as earlier, the transposition line 33 allows an equilibrium of the power distributor 26 to be established when the pressure at the outlet orifice of the braking valve 22 is equal to the sum of the pressures applied by the proportional distributor 43 and the pressure regulator 30 which both have the role of a means for calibrating the power distributor 26.

The control means 30 typically has a pressure adjustable between 0 and 140 bars.

During operation, when the hydraulic pump 23 feeds the braking valve 22, the proportional distributor 43 establishes a first control pressure, typically of the order of 12.5 bars, which is applied in the chamber 451 of the actuator 45.

This pressure in the first chamber 451 of the actuator 45 achieves first calibration of the power distributor 26, which is then in a position for delivering a pressure at the outlet orifice of the braking valve 22 to the braking means 25.

A flow is then established through the flow limiter 31, while the pressure regulator 30 is open, without any control being applied thereto. The flow limiter 31 is typically calibrated in order to establish a pressure loss equal to the first control pressure, for example of the order of 12.5 bars so as to generate substantially zero pressurization of the third chamber 453 of the actuator 45. It is selected so that the flow which is established therein is sufficient for obtaining a fast response of the pressure regulator 30 without saturating it, and so as to not generate a too large pressure drop at the outlet of the braking valve 22.

The pressure at the outlet orifice of the braking valve 22 is then established at the first control pressure of the proportional distributor 43, typically 12.5 bars.

The circuit is then ready to operate as a follower circuit by reacting to the control pressure applied to the pressure regulator 30.

When a control pressure is applied to the pressure regulator 30, the latter closes and causes a rise in pressure in the third chamber 453 of the actuator 45 without reaching the control pressure applied to the pressure regulator 30, which will be added to the pressure established in the first chamber 451 for achieving calibration of the power distributor 26 and thereby increasing the pressure at the outlet of the braking valve 22.

Considering that the first calibration means is driven in order to establish a pressure P1, that the flow limiter 31 is calibrated in order to establish a pressure difference equal to this pressure P1, and that a second calibration means is driven in order to establish a pressure P2, then the pressure applied to the braking means will be equal to P2+P1. In the case when P1 is non-zero and P2 is zero; the braking pressure will then be equal to P1.

As non-limiting examples:
For P1=0 and P2=0, zero pressure will be applied on the braking means 25, which typically corresponds to a configuration in which a parking brake is actuated, and typically corresponds to a configuration adapted to the standard in effect in Italy.
For P1=12.5 bars and P2=0, a pressure equal to 12.5 bars will be applied to the braking means 25, which typically corresponds to a configuration in which a trailer brake is disabled according to the standard in effect in Italy.
For P1=12.5 bars and P2=127.5 bars, the pressure applied to the braking means 25 will be equal to P1+P2=127.5+12.5=140 bars.
For P1=12.5 bars and P2=X bars, the pressure applied to the braking means 25 will be equal to P1+P2=X+12.5 bars.

Figure 5:
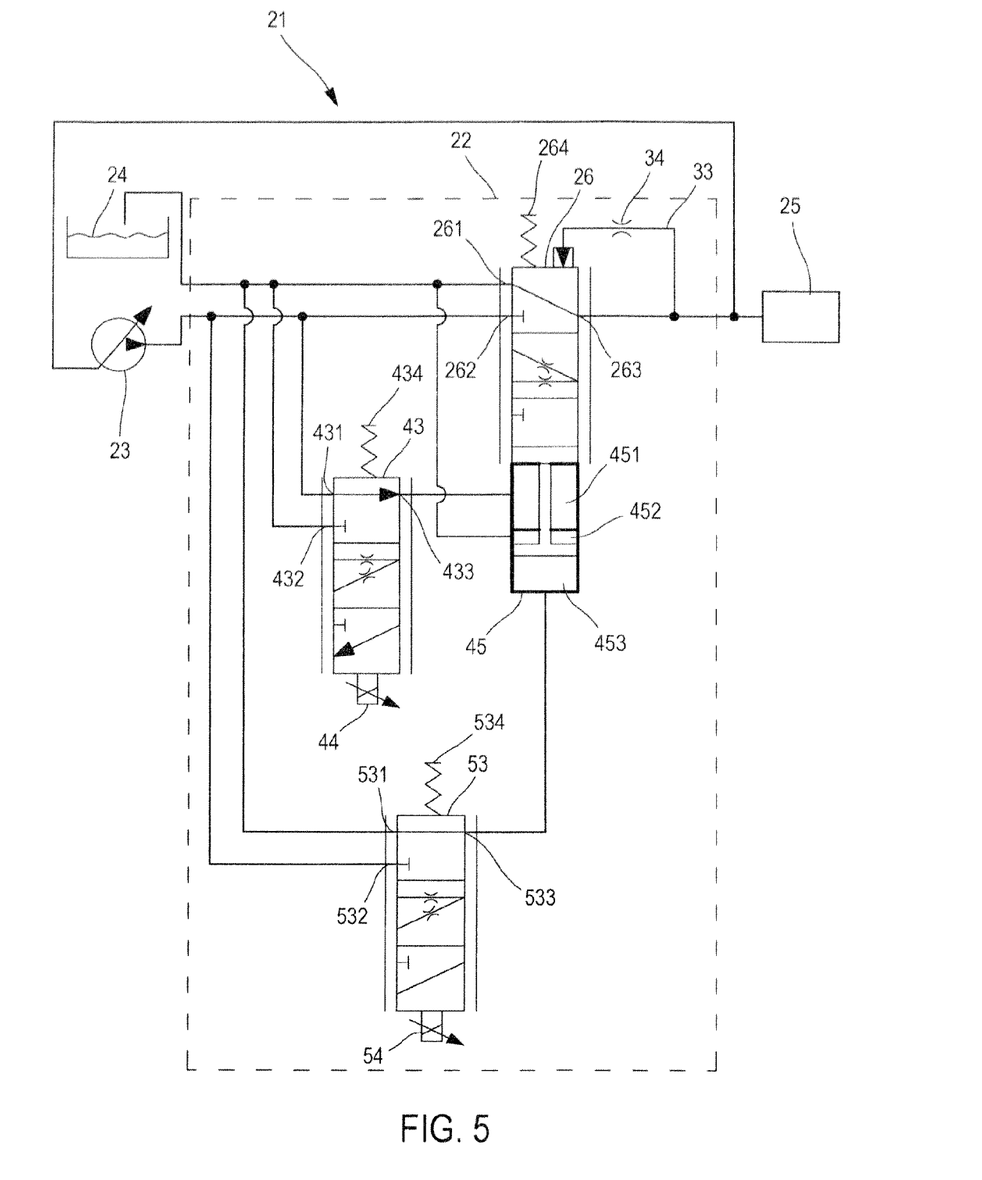
FIG. 5 shows another embodiment of a hydraulic circuit comprising a valve according to the invention.

FIG. 5 shows another embodiment of a hydraulic circuit comprising a valve according to the invention.

The structure of this hydraulic circuit is similar to the one of the circuit shown in FIG. 4, except for the control means 30 which is replaced with a proportional control distributor 53.

This control distributor 53 is similar to the proportional distributor 43 and has three orifices 531, 532, and 533.

The first orifice 531 is connected to the leak orifice of the braking valve 22, the second orifice 532 is connected to its inlet orifice, and the third orifice 533 is connected to the third chamber 453 of the actuator 45.

This control distributor 53 is driven by a variable electric control 54 to which is opposed a return spring 534, and has three configurations:
a rest configuration in which the first orifice 531 is connected to the third orifice 533 while the second orifice 532 is closed;
a braking configuration in which the first orifice 531 is closed while the second orifice 532 is connected to the third orifice 533;
a calibration configuration in which the first orifice 531 and the second orifice 532 are both connected to the third orifice 533 via flow limiters.

Unlike the preceding embodiments, the third chamber 453 is here fed via the control distributor 53 which is positioned upstream from the power distributor 26, contrary to the control means 30 illustrated in FIGS. 3 and 4 which was positioned downstream from the power distributor 26.

It is thus possible to apply a control directly to the control distributor 53, without achieving preliminary priming of the circuit via the proportional distributor 43.

In this embodiment, the calibration of the pressure at the outlet orifice of the braking valve by the calibration means 45 may be achieved with a ratio not equal to 1, notably depending upon the control distributor 53. Alternatively, calibration may be achieved with two different ratios, for example a ratio equal to 1 for the proportional distributor 43 and a ratio distinct from 1 for the control distributor 53. With this configuration it is possible to obtain accurate calibration for the first calibration typically equal to 12.5 bars, and calibration having a slightly smaller level of accuracy for a second calibration typically comprised between 0 and 127.5 bars.

In the same way as earlier, the calibration means, here the piston 45, apply a calibration pressure to the power distributor 26 equal to the sum of the pressures in the first and third chambers 451 and 453. The calibration pressure applied to the power distributor 26 is therefore driven by the controls 44 and 54.

With the braking valve 22 according to the invention it is therefore possible to easily adapt it to the standards in effect in various countries, by being able to apply two distinct and independent calibrations via two calibration means, and to have a calibration pressure of the power distributor 26 equal to the pressure delivered to the braking means via the outlet orifice of the braking valve 22, which therefore gives great pressure stability, which is a significant comfort and accuracy element for obtaining proper braking on a circuit comprising a load-controlled pump, such a pump being for example frequently used on agricultural machinery and/or construction machines.

The invention claimed is:

1. A hydraulic braking valve (22) comprising:
   an inlet orifice intended to be connected to a pressure supply means (23),
   an outlet orifice intended to be connected to a braking means (25),
   a leak orifice intended to be connected to a tank (24),
   a power distributor (26) adapted so as to connect the inlet orifice to the outlet orifice in a braking configuration, and the leak orifice to the outlet orifice in a rest configuration,
   said braking valve (22) wherein the power distributor (26) is driven by two independently driven calibration means,
   wherein said calibration means comprise:
      a first calibration means achieving calibration for a pressure at the outlet orifice comprised between 10 and 15 bars,
      a second calibration means achieving calibration for a pressure at the outlet orifice comprised between 0 and 140 bars.

2. The braking valve according to claim 1, wherein only the one of said calibration means delivering the highest calibration pressure drives the power distributor (26).

3. The braking valve (22) according to claim 1, wherein the power distributor is driven by a power calibration pressure corresponding to the sum of the calibration pressure delivered by the first and the second calibration means.

4. The braking valve (22) according to claim 1, wherein said first and second calibration means are proportional reducers mounted in parallel.

5. The braking valve (22) according to one of claim 1, 2 or 3, characterized in that the first calibration means is a proportional reducer, and in that said calibration means is a pressure limiter.

6. The braking valve (22) according to one of claim 1, 2 or 3, characterized in that the first calibration means is a spring compressed by a hydraulic piston, and in that the second calibration means is a pressure limiter.

7. The braking valve (22) according to claim 1, wherein said calibration is achieved with a 1:1 ratio between the calibration pressure of the power distributor (26) and the pressure of the outlet orifice.

8. The braking valve (22) according to claim 4, wherein the first calibration means and the second calibration means achieve calibration of the power distributor (26) with a ratio equal to 1 and with a ratio different from 1, respectively.

9. A hydraulic braking circuit (21) comprising:
   a hydraulic braking valve (22) having an inlet orifice connected to a hydraulic pump (23),
   an outlet orifice connected to a braking means (25), and a leak orifice connected to a tank (24),
   a power distributor (26) configured to connect the inlet orifice to the outlet orifice in a braking configuration, and the leak orifice to the outlet orifice in a rest configuration,
   wherein the power distributor (26) is driven by two independently driven calibration means,
   wherein said calibration means comprise:
      a first calibration means achieving calibration for a pressure at the outlet orifice comprised between 10 and 15 bars,
      a second calibration means achieving calibration for a pressure at the outlet orifice comprised between 0 and 140 bars,
      said hydraulic pump (23) delivering variable pressure to the inlet orifice of said valve.

10. A vehicle equipped with a braking circuit (21) according to claim 9.

* * * * *